United States Patent [19]

Meickl

[11] 4,299,509
[45] Nov. 10, 1981

[54] BEAM CONNECTOR

[75] Inventor: Gerhard Meickl, Ockenfels, Fed. Rep. of Germany

[73] Assignee: Streif oHG, Linz, Fed. Rep. of Germany

[21] Appl. No.: 69,595

[22] Filed: Aug. 24, 1979

[30] Foreign Application Priority Data

Aug. 31, 1978 [DE] Fed. Rep. of Germany ....... 2838053

[51] Int. Cl.³ .............................................. F16B 9/00
[52] U.S. Cl. .................................. 403/252; 403/174; 5/288
[58] Field of Search ............... 403/252, 253, 174, 178, 403/187, 209; 5/288, 295, 296, 301, 304

[56] References Cited

U.S. PATENT DOCUMENTS

| 90,776 | 6/1869 | O'Keefe | 5/295 |
| 1,403,435 | 1/1922 | Marvin | 5/288 |
| 1,972,108 | 9/1934 | Richardson | 5/288 X |
| 3,972,638 | 8/1976 | Vivoli | 403/174 |
| 4,043,689 | 8/1977 | Spencer et al. | 403/252 |

FOREIGN PATENT DOCUMENTS

| 334631 | 3/1921 | Fed. Rep. of Germany | 5/288 |
| 508657 | 7/1920 | France | 5/304 |
| 745641 | 2/1933 | France | 5/296 |

Primary Examiner—James Kee Chi
Attorney, Agent, or Firm—Oblon, Fisher, Spivak, McClelland & Maier

[57] ABSTRACT

A connector of a structural part such as a beam with another structural member is disclosed. The connection consists of a first plate which is fastened to the beam in a torsion free manner. The first plate includes a hook having a horizontal supporting area at the lower end and two vertical contact areas. A second plate is fastened to the other structural part and is in planar alignment with the first plate. The second plate includes fitting areas which mate with the supporting area and vertical contact areas of the first plate.

22 Claims, 18 Drawing Figures

BEAM CONNECTOR

BACKGROUND OF THE INVENTION

1. Field of the Invention

The present invention relates to the connection of structural elements for attachable skeleton structures in uniform and mixed construction by means of perpendicularly placed plates.

2. Description of the Prior Art

In a skeleton construction, horizontal beams from different directions must be connected in a plane to a pillar. Particularly in wooden structures, the forces must often be introduced indirectly into the pillars according to the customary trussed frame, half-timber or tongue construction whereby additional stress is produced in the structural parts because, for reasons of space, it is constructively not possible to introduce the forces directly into the pillar. Wood construction necessarily shows great difficulties when involved in skeleton structures, particularly when using prefabricated units, and is representative of all other types of construction.

As a rule, multipart cross-sections are necessary because of the connections which lead to connection and sealing problems concerning the overall construction. Shrinking and swelling of of the timber effect changes in the shape which have an undesirable effect on the accuracy and, thus, involve requirements with regard to sealing concerning the overall construction which are difficult to meet.

Beams positioned in different directions can only be arranged on top of each other with the disadvantage that problems arise in the course of the overall construction.

In classical wooden structures, tie beams were connected by means of pegs in the peg holes of the pillar and secured in a traction-resistant manner with wooden nails. Uneconomically large wood cross-sections became necessary owing to the resultant weakening in the connection.

Connecting means used today must be installed in the building while under construction and lead, therefore, to high assembly costs. Sometimes, the cross-sections of the beams must be chosen of a larger size in order to be able to accommodate the connecting means at the point of the load introduction. This leads also to uneconomical solutions since more timber must be used than is actually necessary on the basis of the load. This applies to the same degree to a beam support by cross-grain contact.

Shoe supports of sheet metal have been developed which are fastened to beams or pillars (German Pat. No. 2,622,843 and German Pat. No. 2,611,236) and serve as supports for tie beams. Such support shoes are only in a position to remove loads to a limited degree because the connecting means are subject to single shearing strain and also to being pulled out because of the eccentric load introduction.

Fittings in the form of steel fishplates have also become known in the literature, which are laterally fastened at the end of the beam and engage in holes of the pillars with two jutting-out hooks (German Pat. No. 2,166,879). The prerequisite for such fittings is that the pillar have a metal cross-section which receives the high pressures in the hook. Similar fittings are used in the manufacture of furniture, preferably for beds, the lateral walls of which engage with their front in screwed-on, perforated sheet metal fittings. However, the supporting capacity of such connections is very limited owing to the pressures in the hook as well as the low supporting capacity of the fastening means for the fittings. To connect wooden pillars to wooden beams in this manner is not possible owing to the fact that pull-out stresses are exerted on the fastening means which they cannot withstand.

All fittings attached on the outside do not meet the requirements of fire protection according to the Fire Resistance Class F 30.

Also known are knotted plates with the help of which several rods from different directions in the same plane are joined together. In the case of the known knotted plates, the connected structural parts are held together by means of fishplates. The continuous plates must be assembled on site and frictionally connected. The disassembly and reassembly is not possible or is connected with the destruction of the material.

The Italian Pat. No. 566,424 protects a beam joining connection where a plate is embedded in the perpendicular front slot with a projecting hook-like end. In the slot of another beam, a bolt is horizontally arranged into which the bent part of the hook of the plate of the first beam is hung. The supporting capacity of this connection is limited by the bolt diameter and the projecting timber length.

In the Swiss Pat. No. 500,349, two beams at a right angle with each other are hung into each other with the corresponding projecting hooks and rest on the subjacent, rectangular beam connection which is hooked into each of them. The plates must be relatively thick in order to introduce the concentrically attacking loads into each other and, finally, into the pillar head on the crosscut wood by means of contact which leads to an undesirable weakening of the cross-section. This connection can not be designed in such a way that the full supporting load of the structural parts can be transmitted through the connecting parts. The connection is the weakest part in the case of both solutions.

Also, splitting forces are produced in the pillar head with horizontal, traction-stressed beams which cannot be received by wooden pillars.

All wood connections have the following disadvantages in common:

they have high assembly cost on site,
there is danger of damaging the wooden parts when driving in the fastening means, particularly in case of rod pegs,
owing to shrinking, changes in dimensions and wedgings occur, exerting an influence on the construction,
disturbed flow of forces and additional stresses occur, owing to off-center situations, there is problematic overall construction, for example, wall connection, when secondary beams are connected outside the plane pillar-main beam.

The skeleton construction becomes economical only by means of a rational assembly which must be particularly suitable for constructions of wood with orthogonal beam systems in a grid structure. However, the achievable accuracy for industrially made structural parts can only then be transferred to the overall construction to be made from them if one is successful in also making the connections accurately and in designing them in such a manner that they no longer have an influence on the size of the beams and pillars. It is, therefore, also an object of the invention to design the connection in such a way that only the size of the beams and the field moment or the bending or the cross-sections of the pillars remain decisive for the supporting capacity of the system.

The novel connection must, additionally, also take into account the requirement in a prefabricated accurate skeleton construction that the deforming shrinkage which is unavoidable in case of wood, particularly cross-grain when connecting cross-cut to end-grained wood, has no influence on the supporting capacity of the construction and, in particular, does not cause any additional wedging. Furthermore, the connection must meet the requirement that it has a high degree of prefabrication and can be fully installed in the structural parts in the plant so that the placing of connecting means is almost eliminated on the construction site. The making of the skeleton on the construction site must be limited to the joining of true-to-size structural parts. The connecting of the structural parts should not produce any additional deviations from dimensions so that an improvement of the accuracy in size is obtained in the system. The invention must avoid essential deviations on the construction site and must produce at least the same fire resistance as the structural parts have themselves.

In the case of known connections, only a bolt is to be provided on the side of the structural part. In case of a support on the side of the structural part, at the utmost two beams opposite each other can be connected but not two cross-wise arranged beams and neither three of four beams on the same level in accordance with the problem to be solved by this invention. In case of wooden pillars, traction forces from the beams could not be transferred because of the splitting of the pillar.

In case of another connection (Swiss Pat. No. 500,349), crosswise arranged beams engage with hooks into each other. It is not clear how horizontal forces are introduced into the pillar since splitting forces develop on the pillar head.

The removal of these disadvantages leads to the problem where a connection must be created with the help of which the beam transmits the loads to exactly defined areas. The transverse force transmitting supporting area must be designed of a sufficient size and must be precisely fitting. The load receiving possibility shall not be limited by the contact area in the wood but it shall be possible to increase it by a random number of connecting means. By the same token, contact areas to receive the traction forces for structural parts placed in one plane are to be created in such a manner that no splitting traction forces develop in the structural part. Furthermore, the stuctural parts placed in one plane must be in a position to transfer their pressure forces efficiently as well as safely. It shall, moreover, be possible to connect in a horizontal plane up to 4 beams to a pillar as required, said beams having ends of the same design.

SUMMARY OF THE INVENTION

The task is accomplished by the fact that vertically arranged shaped parts with hook-like projections are inserted in the cross grains of the beams. When connecting wooden beams to wooden pillars, the shaped parts, consisting of plates with the load on the disk plane, are installed in such a manner that the hook-like projection juts out from the cross grain of the beam. If, however, it is a question of a connection of a wooden beam to a main beam, the hook plate is not inserted so that it juts out. This is done in such a way that, preferably in the center of the cross-section, a slot is placed with a width provided by the thickness of the plate. Load-transmitting plates, characterized by hook-like projections, are placed into the beam ends. The shaped parts inserted in the pillar head serve correspondingly the purpose of receiving the load. They consist of plates having a shape corresponding to the hook of plate A. In interaction with their connecting means, the shaped parts B prevent the pillar head from being split. Shaped parts are provided for the traction-resistant connection of pillars which effect simultaneously the locking of beam-pillar node using simple connecting means. The load-receiving supporting plates can be designed in a number of ways and are also suitable for the connection of wooden beams to main beams. Modifications of the shaped parts are necessary in accordance with the properties of the skeleton construction material and fastening means.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and wherein.

DETAILED DESCRIPTION OF THE PREFERRED EMBODIMENTS

Numbers in connection with capital letters express the number of supports of a plate.

Figure 1:
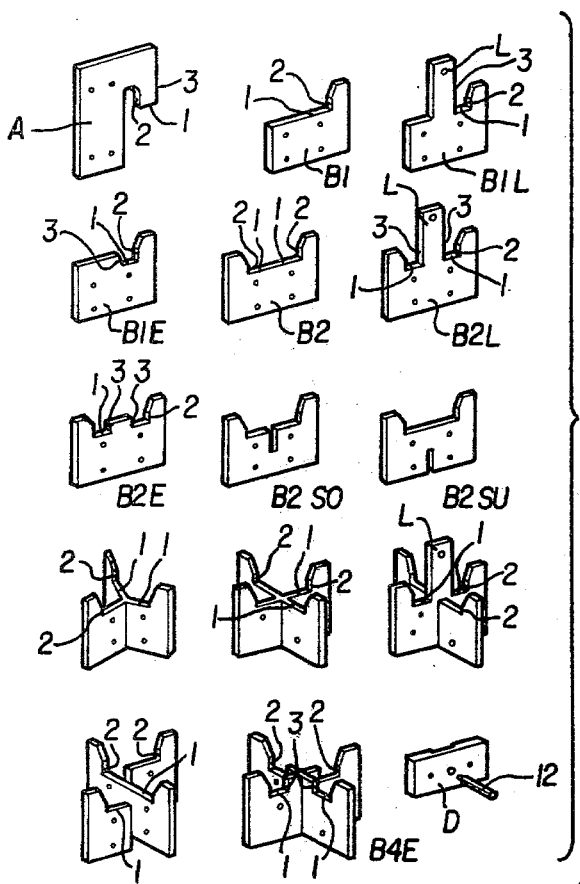
FIG. 1 shows plates A, B and D in isometric representation.

As seen in FIG. 1, the special characteristic of load transmitting plate A lies in the fact that its hook-like projection fits into the corresponding release of support plate B so that the horizontal area (1) of the end of the hook is the transverse force transmitting contact area and traction forces are transmitted on the vertical contact area (2) on the inside of the hook and pressure forces are transmitted on the vertical contact area (3). A fixed-end moment is transferrable with corresponding accuracy at the release and the end of the hook by means of the combination of two vertical contact surfaces (2 and 3) also in connection with an inclined area. The plates A, B and locking plate D are fastened in the wooden structural parts with the help of glue, nails, rod pegs, bolts, glued-in screws and such. The dimensions of the plates are adjusted to the stress. The stress also determines the dimensions of the skeleton structural parts so that cross-section-related standard plates can be standardized.

The forces occurring at the connection are decisive for the geometry of the design of the plates A and B. An optimization is then achieved when, for example, the center of mass of the supporting area (1) is arranged above the connecting means in plate B. Thus, the stress on the connecting means in plate B, if these are placed as closely as possible to the edge of the structural parts, is minimized.

Figure 2:
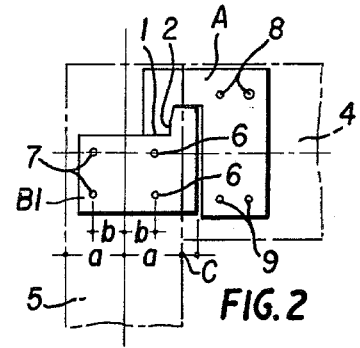
FIG. 2 shows the connection of a beam to a pillar with the help of a pair of plates, which touch each other in the horizontal supporting area and the contact area, for the fork bearing of a beam where one of the plates has a plate projection and a pair of pegs is arranged axial-symmetrically with a pair of pegs under the center of mass of the horizontal supporting area.
Figure 3:
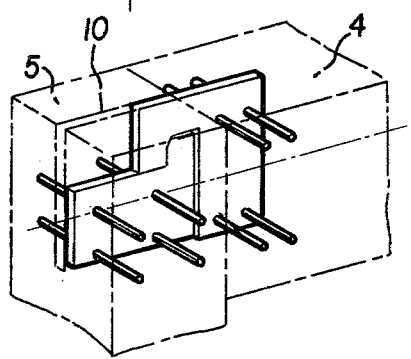
FIG. 3 shows the beam-pillar connection of FIG. 2 in isometric representation with a groove being placed into the pillar head.

In order to achieve a better understanding, the installation of the plates into the beam (4) and the pillars (5) are explained in FIGS. 2 and 3 using the simple example of a single beam.

In accordance with the forces to be received, plate B 1 is doweled into the pillar head in such a way that the pair of dowels (6) have the smallest possible distance from the edge. The pair (7) is then arranged axial-symmetrically in the pillar. A projection C of the doweled plate B 1 is provided opposite the pillar surface. In analogy, the depth of the slot is calculated in the beam cross grain into which the plate A must be placed. When proceeding in such a manner, the pair of dowels (6) takes the closest position to the edge in accordance with its size. The stress exerted upon them is therefore the lowest. However, this applies, at the same time, to the stress exerted upon plate A since its cantilever moment must be received by the pairs of dowels (8) and (9). In order to improve the fire resistance and to achieve a more favorable flux of force, the groove (10) is preferably placed centrally into the pillar head. However, this does not exclude eccentrical connections or axial-symmetrical ones made with two or more plates.

After the true-to-size installation of plates B1 and A, which can be industrially installed, the transverse force of the supporting area (1) is transferred from plate A to plate B after the assembly thereof. The vertical contact area (2) serves the purpose of transferring horizontal traction forces but, at the same time, also of achieving, when assembled, as intensive a connection as possible of the beam (4) to the pillar (5) by means of a tight fit without lifting forces becoming effective for the beam (4). This is because the inclination is adjusted to the roughness and the friction angle of the contact surfaces. Other designs of the area (2), i.e. a continuously bent or broken area, become, from time to time, appropriate. The connection is, at the same time, also torsion-resistant owing to the fact that plate B1 engages the groove of the beam (4) through the projection at the depth C.

Figure 4:
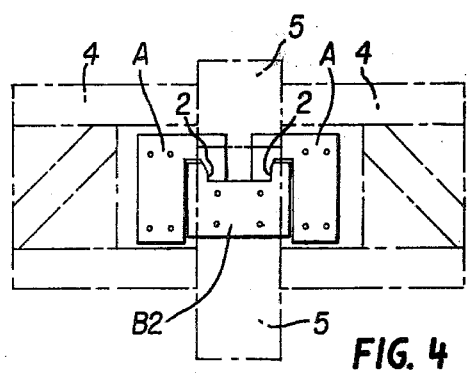
FIG. 4 shows the symmetrical connection of two beams to one pillar with the help of a plate.
Figure 13:
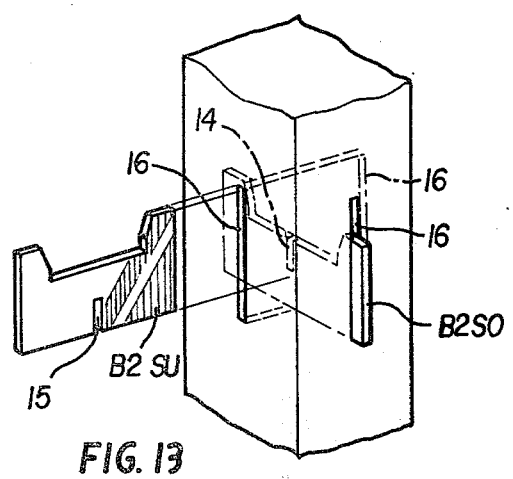
FIG. 13 shows the installation of a cross plate consisting of plates in a continous pillar in an isometric representation.

A plate B2 with symmetrical release is used in the connection of two grid beams (4) opposite each other to a pillar (5) as shown in FIG. 4. The vertical contact areas (2) transmit horizontal traction forces. The tightening surface assures that, during assembly, the beams (4) are pulled towards the pillar (5) without a gaping joint, provided a true-to-size assembly has been effected. Plates A as well as B2 are of such a size that they can receive unintentional fixed-end moments without causing any damage. However, if required, they can also be designed and dimensioned in such a way that the book of plate A, together with the contact surface between lower chord and pillar, receives a pair of forces, i.e. restraint or partial restraint of the beam (4) is effected to the pillar (5). A combination of vertical contact areas (3) with vertical contact areas (2), as shown in FIG. 1 and FIG. 13 with the help of the example B4E, is in a position to also transfer moments if only the tolerances of the dimensions are small enough.

Figure 5:
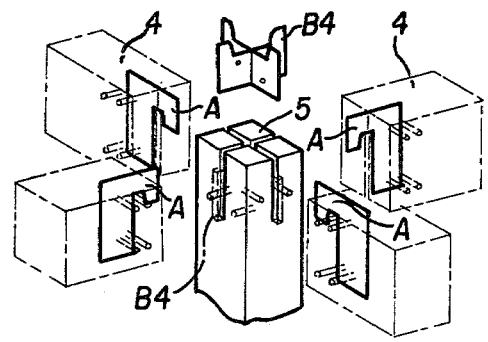
FIG. 5 shows in isometric representation, the connection of four beams with different beam height to a pillar head with the help of a cross-shaped plate and load transmitting plates so that all upper edges of the beams are located in the same plane which makes an orthogonal skeleton system possible.

In the isometric representation of the point of intersection of four beams and their connection to a pillar in FIG. 5, it becomes clear the universal importance the novel connection has for skeleton structures consisting of beams having different heights. In this context, it is of no importance whether the individual beams consist of different materials, of full wood, glued laminated wood or of beams with put-together cross-sections. In all cases, beams of different cross-sections can be connected to a pillar on the same level. The connection of main and secondary beams to one pillar no longer represents a problem and neither does the system of orthogonal or polygonal beams grids. The loads are introduced by beams from all directions under the same conditions.

Figure 6:
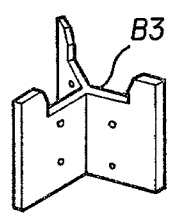
FIG. 6 shows the isometric representation of a three-shank plate.
Figure 8:
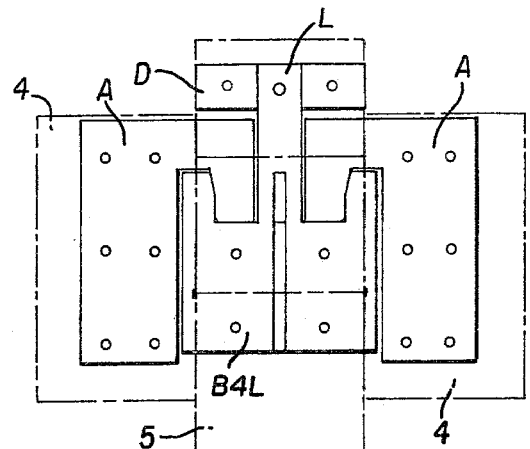
FIG. 8 shows a pillar head which, with the help of a fitting plate inserted and fastened in the pillar head, and in connection with a plate of the pillar foot, permits a traction-resistant connection of the pillars and, at the same time, the locking of the node.
Figure 7:
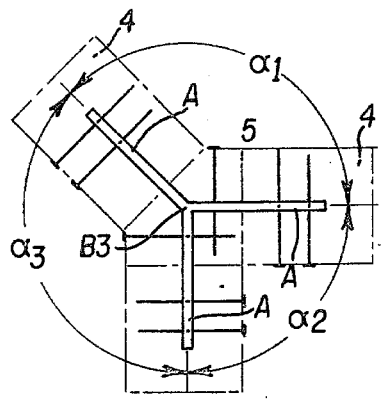
FIG. 7 shows the horizontal projection of a connection of three beams in the same plane to a pillar with the help of a plate whose shanks have the connecting angles $\alpha_1$, $\alpha_2$, $\alpha_3$.

Also the very unusual joining of beams of different width and height at a nodal point under different $\alpha_1$, $\alpha_2$, $\alpha_3$, as shown in FIG. 7, can be achieved with the help of the star-shaped plate B3 in FIG. 6, without causing any problems.

Figure 9:
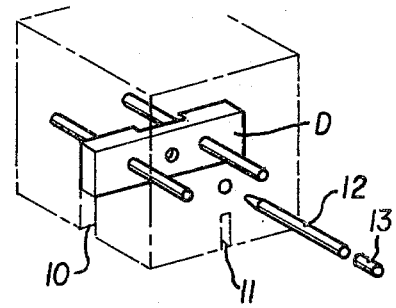
FIG. 9 shows the pillar foot from FIG. 8 in an isometric representation with a wider groove in which a load-distributing plate is inserted and a cross groove with a locking bolt and a locking pin.

The universality of the novel connection is still further exposed by the connections shown in FIGS. 8 to 13 which represent random examples. The pillar joint shown in FIG. 8 at a point of intersection of four beams (4) is made with the help of plate B4L, which has a fishplate L. The fishplate engages the groove (10) of the pillar foot to be put up and is connected with an inserted, doweled plate D by means of a cotter pin (12). Therefore, the plate B4L is, in this case of application, not only the support for the plates A of the beams (4) but, additionally, also the connecting element for the pillar joint which is placed on a lower level than the upper edge of the beam (4). The pillar foot joint is thus included in the nodal point and not only serves the purpose of locking and securing but also considerably facilitates the assembly. However, when placing the pillar foot joint at a lower point, constructional advantages are also obtained. The advance wood length for the cotter pin is increased with the minimizing of the length of the fishplate and the pillar foot is secured against horizontal forces from all directions. In FIG. 9, 11 is a cross groove and 13 is a locking pin.

Figure 10:
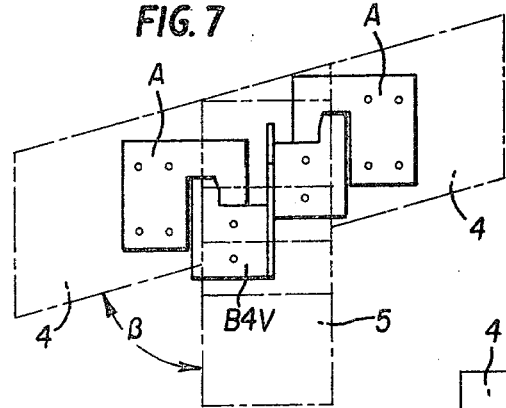
FIG. 10 shows the view of a cross node whose beam plane is at an angle $\beta$ to the axis of the pillar using a plate whose parts are staggered in height towards each other corresponding to the inclination of the beam plane.

In FIG. 10, parts of the plate B4V, opposite each other, are staggered in height. Thus a plate develops for a beam plate inclined by the angle B around the axis of the pillar. With a small angle B, other shapes of the plates A and B4V than shown are appropriate.

Figure 11:
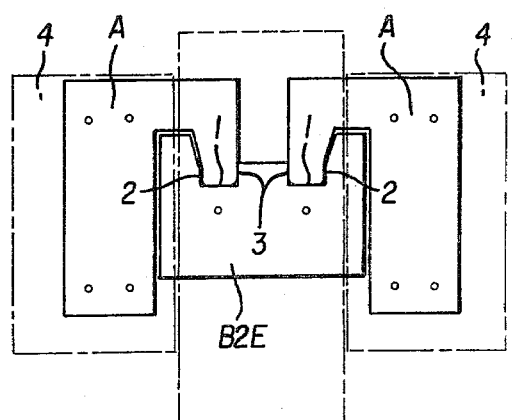
FIG. 11 shows the view of a continuous pillar with two beams in whose cross grains the load transmitting plates are fastened which engage into a plate.

FIG. 11 shows that plate B3E can also be installed with a continuous pillar (5) which must have a slotted, continuous groove (1). The slotting must be done with a sufficient length in order to be able to maintain the position of the beam (4).

In the case of a continuous pillar with the connection of four beams on the same level, the supporting plate consists of 2 plates B2S with top recess (14) and corresponding bottom recess (15) in a sufficiently long cross slot (16), and jointed together to form a cross plate B4 during assembly as can be noticed from FIG. 13.

Figure 12:
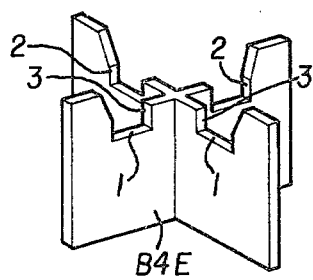
FIG. 12 shows the isometric representation of a plate with sunk supporting areas whereby horizontal traction forces and horizontal pressure forces in the vertical contact areas are directly transmitted to the plate.

The special characteristic of plate B4E with sunk, transverse force transmitting supporting area (1) according to FIG. 12 makes it possible that horizontal forces can be transmitted from the beams (4) into the pillar (5) through the plates A and B4E and, if the necessity arises, even moments. For this purpose, no contact is necessary between beam and pillar. Therefore, the shrinking of the wood has actually no effect on the transmission of forces.

Figure 14:
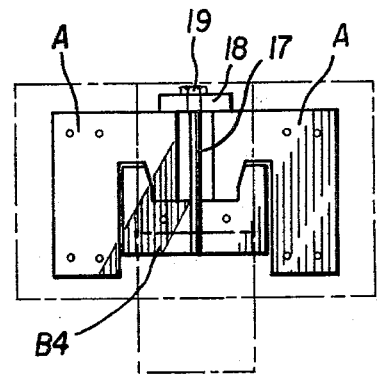
FIG. 14 shows the view of a cross node with the supporting plate which has additionally a safety device against lifting off in the form of a bolt connected with the cross plate, clamping parts and a nut.
Figure 15:
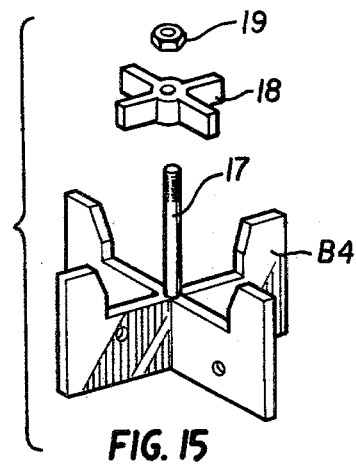
FIG. 15 shows the isometric representation of the supporting plate with a lift-off safety device for the beams, optionally in the form of the one installed in FIG. 14.

In special cases, when the connection must be secured against lifting-off, additional safety precautions become necessary as are, for example, shown in FIGS. 14 and 15 for a cross node. A thread bolt (17) is connected with the supporting plate B4 which runs in the point of intersection of the slots in the pillar head. A clamping plate is placed on the end of this safety bolt which covers the ends of the plates A projecting from the beams. With the help of the clamping plate, for example, by the crosspiece (18) and the nut (19) as fastening means, the plate ends A are braced against the cross plate B4 fastened in the pillar head. In this way, the beams are also secured against lifting forces.

This type of securing system, which is to apply as a substitute for similar solutions or mechanical securing systems in the form of spring snaps or such, has the advantage that it can, at any time, be removed or remounted which can be an advantage for certain applications.

Figure 16:
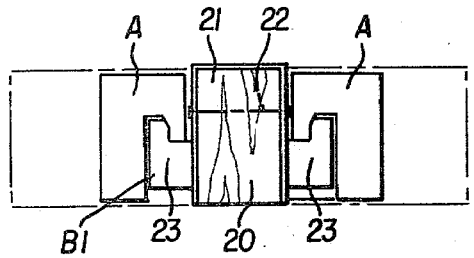
FIG. 16 shows the view of the connection at a jutting-out or continuous beam with the help of a covering steel fishplate, for example, fastened with bolts, with welded-on plates which have a cotter pin borehole as a safety measure against the lifting-off of the beam.
Figure 17:
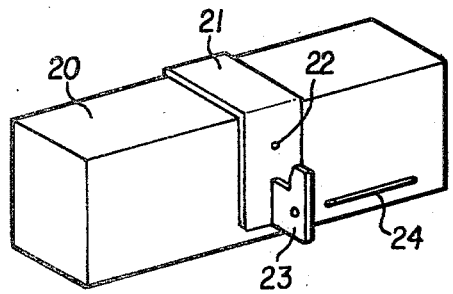
FIG. 17 shows the isometric representation of the covering steel fishplate according to FIG. 16.

In FIG. 16, the connection of two wooden beams, equipped with non-projecting plates of the shape A, is shown in relation to a continuous or projecting beam (20). The supporting plates B1, which have a borehole (23), are welded to a steel cover plate (21) placed over the beam (20) which is fastened to the beam (20), for example, by a bolt or such at (22). For the sake of clarity, the steel cover plate (21) in FIG. 17 is isometrically represented with fastening (22) and supporting plate B1. After the beam is suspended, a connection is made by means of a cotter pin (24) in such a way that the beams cannot lift off the continuous beam (20).

Figure 18:
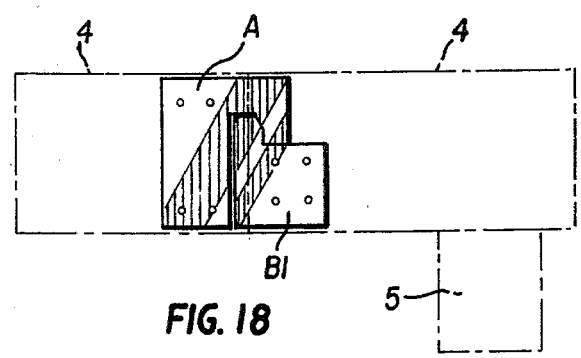
FIG. 18 shows the use of load transmitting plates in a beam and a support plate in a second beam running in the same direction to produce a Gerber hinge at a beam joint.

Finally, the cross grain joining of beams also becomes possible with the novel connection as shown in FIG. 18. Such a joint will be made when it proves to be expedient to form a Gerber hinge for static, constructional reasons. If necessary, the suspended beam with plate A can be secured against unintentionally being lifted out by means of a cotter pin (24), or such.

The prerequisite for all structural part connections known so far, particularly nodal plates, is that connecting means must still be placed on at the construction site. With the help of the multitude of shaped parts, it is possible to achieve a variation-rich prefabrication wood skeleton construction. The advantages of the connection according to the invention of skeleton structural paets can be briefly summarized as follows:

1. Transfer of wage-intensive installation of connecting means to the plant;
2. Simplified assembly on the construction site;
3. Easy disassembly and reassembly;
4. Mass production of skeleton structural parts for polygonal or othogonal grid module systems;
5. Reduction of cost owing to faster assembly;
6. Use of the same shaped parts for the connection of solid structural parts;
7. High accuracy in dimensions of the structural parts and of the joined system;
8. Elimination of wood shrinking with plates having pressure contact areas (3);
9. Influence on transmission of forces eliminated;
10. High fire resistance; and
11. Application for all wood cross-sections, both shaped and hollow cross-sections.

The importance of the connection according to the invention covers the smallest wood cross-section for minor areas of application as well as the wooden structure of high carrying capability, dimensioned according to static, constructional points of view. It also covers skeletons of metal, plastic or reinforced concrete structural parts. Owing to the high multitude of designs, the connection according to the invention is preferably suitable for the transmissions of transverse forces, when required, in combination, to receive horizontal traction and pressure forces as well as bending moments.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A connection of a structural part such as a beam having a longitudinal axis with another structural part, said connection comprising:
   a first plate fastened to said beam in a torsion proof manner in a vertical plane extending in a direction parallel to said longitudinal axis, said first plate including connecting means in the form of a vertically extending hook including a horizontal supporting area at the lower end of said hook and two vertical contact areas; and a second plate fastened to said other structural part, said second plate extending vertically in the same plane as said first plate, said second plate including connecting means in the form of fitting areas for said supporting area and said contact areas, wherein said first plate transfers vertical forces to said second plate via said horizontal supporting area and said contact areas.

2. A connection of a structural part such as a beam having a longitudinal axis with another structural part for supporting said beam, said connection comprising:

a first plate fastened to said beam in a torsion proof manner and in a vertical plane extending in a direction parallel to said longitudinal axis, said first plate including connecting means in the form of a vertically extending hook including a horizontal supporting area at the lower end of said hook for receiving vertical forces, and a vertical contact area on the inner edge of said hook for receiving traction forces: and a second plate fastened to said other structural part, said second plate extending vertically in the same plane as said first plate, said second plate including connecting means in the form of fitting areas for said supporting area for receiving vertical forces, and for said contact area for receiving traction forces, said second plate also providing a compressive force contact area for the frontal area of said beam.

3. The connection of a beam with another structural part according to claim 1 or 2, wherein said structural parts consist of wood.

4. The connection of a beam with another structural part according to claim 1 or 2, wherein said beam and structural part do not consist of the same material.

5. The connection of a beam with another structural part according to claim 1 or 2, wherein said hook of said first plate and said second plate have subsequent to the contact area, a magnetic surface and locking takes place when said structural parts are attached to each other.

6. The connection of a beam with another structural part according to claim 1 or 2, wherein said beam is made of metal and the end of said beam is adapted to hold said first plate.

7. The connection of a beam with another structural part according to claim 6, wherein said plates are arranged in the center of the cross-section of said structural parts.

8. The connection of a beam with another structural part according to claim 7, wherein at least two of said plates of the same kind are arranged symmetrically to the center of said cross section.

9. The connection of a beam with another structural part according to claim 1 or 2, wherein said plates are fastened in said structural parts by mechanical fixing.

10. The connection of a beam with another structural part according to claim 3, wherein said connecting means are arranged symmetrically to said support axis and, where said plates are orthogonal cross plates, said connecting means run in both directions.

11. The connection of a beam with another structural part according to claim 3, wherein rod-shaped connecting means for the fastening of second plates with more than two supports are installed without slackness so that said rod shaped connecting means are statically rigidly held in said second plates and have a higher supporting capacity against torsion of said second plates.

12. The connection of a beam with another structural part according to claim 3, wherein said second supporting plate is installed in said other structural part in such a manner that the center of mass of said horizontal supporting area of said first plate is above the connecting means of said second plate.

13. The shaped parts according to claim 1 or 2, wherein said plates consist of wooden material.

14. The shaped parts according to claim 13, wherein said second plate consists of several supports for several first plates in combination with a fishplate.

15. The shaped parts according to claim 13, wherein at least two of the supports of the second plate are staggered towards each other with regard to their level.

16. The connection of a beam with another structural part according to claim 1 or 2, wherein of of said plates fits into a slot of the other structural part to a predetermined depth.

17. The connection of a beam with another structural part including a pillar foot according to claim 1 or 2, wherein said plate includes at least one vertical fishplate for the connection with a plate fastened by a cotter pin in the pillar foot located above it, resulting in a traction-resistant pillar joint which locks the suspended beams against lifting forces.

18. The connection of a beam with another structural part according to claim 1, wherein said hook in said first plate and the corresponding connecting means in said second plate are precisely aligned at said supporting area and said vertical contact areas so that a torque can be transferred from said first plate to said second plate.

19. The connection of a beam with another structural part according to claim 1 or 2, wherein in order to secure said connection against being lifted off, the beam with said second plate is fastened by a bolt and the retaining of the beam in said first plates is effected by means of a crosspiece and a threaded nut.

20. The connection of a beam with another structural part according to claim 1 or 2, wherein at the junction of non-joined structural ports, said second plate consists of two plates for the connecting of four intersecting beams, that one such plate has in the plate center on the top a recess for the other such plate with a recess at its bottom and thus put together and fastened in the cross-slot of a structural part to form a crossplate.

21. The shaped parts according to claim 1 or 2, wherein said plates consist of plastic material.

22. The shaped parts according to claim 1 or 2, wherein said plates consist of metal.

* * * * *